(12) United States Patent
Levensalor et al.

(10) Patent No.: US 11,546,229 B1
(45) Date of Patent: Jan. 3, 2023

(54) SYSTEMS AND METHODS FOR DISAGGREGATED SOFTWARE DEFINED NETWORKING CONTROL

(71) Applicant: CABLE TELEVISION LABORATORIES, INC., Louisville, KY (US)

(72) Inventors: Randy Levensalor, Boulder, CO (US); Steven M. Pisarski, Erie, CO (US); Christopher J. Corcimiglia, Cumming, GA (US); Dan Schrimpsher, Huntsville, AL (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 17/375,778

(22) Filed: Jul. 14, 2021

Related U.S. Application Data (62) Division of application No. 16/000,721, filed on Jun. 5, 2018, now Pat. No. 11,095,529.

(60) Provisional application No. 62/515,048, filed on Jun. 5, 2017.

(51) Int. Cl.
| | | |
|---|---|---|
| *H04L 41/00* | (2022.01) | |
| *H04L 67/10* | (2022.01) | |
| *H04L 41/0806* | (2022.01) | |
| *H04L 67/1001* | (2022.01) | |
| *H04L 41/0213* | (2022.01) | |

(52) U.S. Cl.
CPC .......... *H04L 41/20* (2013.01); *H04L 41/0806* (2013.01); *H04L 67/10* (2013.01); *H04L 67/1001* (2022.05); *H04L 41/0213* (2013.01)

(58) Field of Classification Search
CPC . H04L 41/20; H04L 41/0806; H04L 41/0213; H04L 67/1001; H04L 67/10
USPC .................................................. 709/204, 232
See application file for complete search history.

(56) References Cited

U.S. PATENT DOCUMENTS

| | | | |
|---|---|---|---|
| 8,830,823 B2* | 9/2014 | Koponen | H04L 41/0893 370/219 |
| 9,450,817 B1* | 9/2016 | Bahadur | H04L 41/0806 |
| 2016/0330076 A1* | 11/2016 | Tiwari | H04L 41/0895 |
| 2017/0331669 A1* | 11/2017 | Ganesh | H04L 41/0226 |

* cited by examiner

*Primary Examiner* — Wing F Chan
*Assistant Examiner* — Leon Y Tseng
(74) *Attorney, Agent, or Firm* — Armstrong Teasdale LLP (57) ABSTRACT

A software defined networking (SDN) controller for a communication network is provided. The SDN controller includes a northbound interface, a southbound interface, and a database as a service (DBaaS) layer. The northbound interface includes an application layer having one or more independent SDN applications. The southbound interface includes an adapter layer having one or more independent device adapters. The DBaaS layer includes a persistent DBaaS unit and a state DBaaS unit.

20 Claims, 4 Drawing Sheets

SYSTEMS AND METHODS FOR DISAGGREGATED SOFTWARE DEFINED NETWORKING CONTROL

CROSS REFERENCE TO RELATED APPLICATIONS

This application is a divisional of U.S. application Ser. No. 16/000,721, filed Jun. 5, 2018. U.S. application Ser. No. 16/000,721 claims the benefit of and priority to U.S. Provisional Patent Application Ser. No. 62/515,048, filed Jun. 5, 2017. The disclosures of both of these applications are incorporated herein by reference in their entireties.

BACKGROUND

The field of the disclosure relates generally to management of computer networks, and more particularly, to management of the control plane for a software defined network (SDN).

Conventional management of the SDN control plane is managed by a central SDN controller, which is run on a single or clustered application. Such conventional SDN controllers are implemented for configured processes that are executed in the same runtime, and are thus designed in a similar monolithic manner for ease of management, data delivery, administration, and performance under load. However, conventional SDN controllers will include subsystems that are not generally saturated. Although the addition of new node to a cluster s mitigate performance issues come on the monolithic nature of conventional SDN controllers is known to introduce unintended complications to the system utilizing the SDN controller, such as undesirable resource utilization allocated to processing threads that our not actually experiencing any problems, or need for resources. SDN controllers are capable of maintaining a number subsystems in the same runtime; however, conventional SDN controller designs do not permit resource allocation to only what is necessary.

The monolithic architectures of conventional SDN controllers are therefore known to inherently lead to such system performance problems. These conventional SDN controllers additionally are known to experience problems with respect to state management, vendor lock-in, and interoperability. Since SDN controllers must persist metadata about each entity within its inventory, as well as the current state thereof, each controller is conventionally designed to have its own storage and management means, each of which requires its own subsystems to be coupled to the controller core.

Figure 1A:
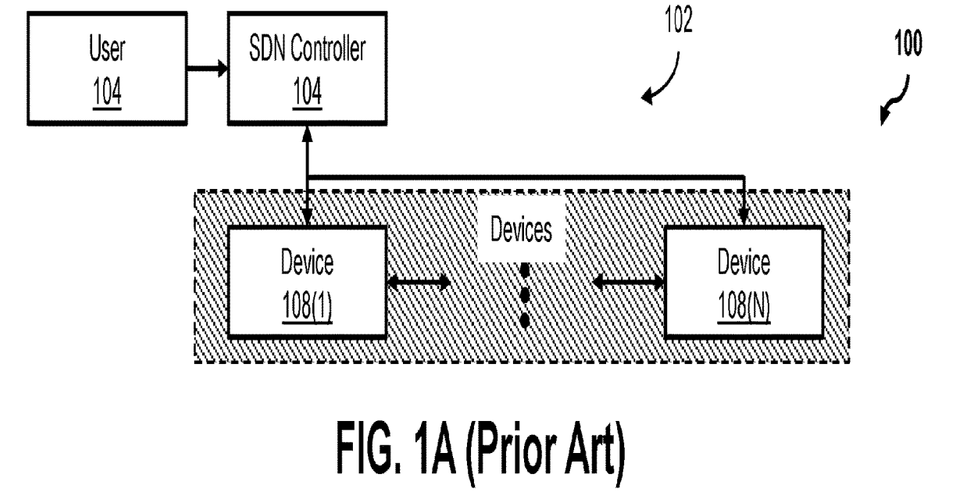
FIGS. 1A, 1B, and 1C are schematic illustrations of conventional SDN system architectures.
Figure 1B:
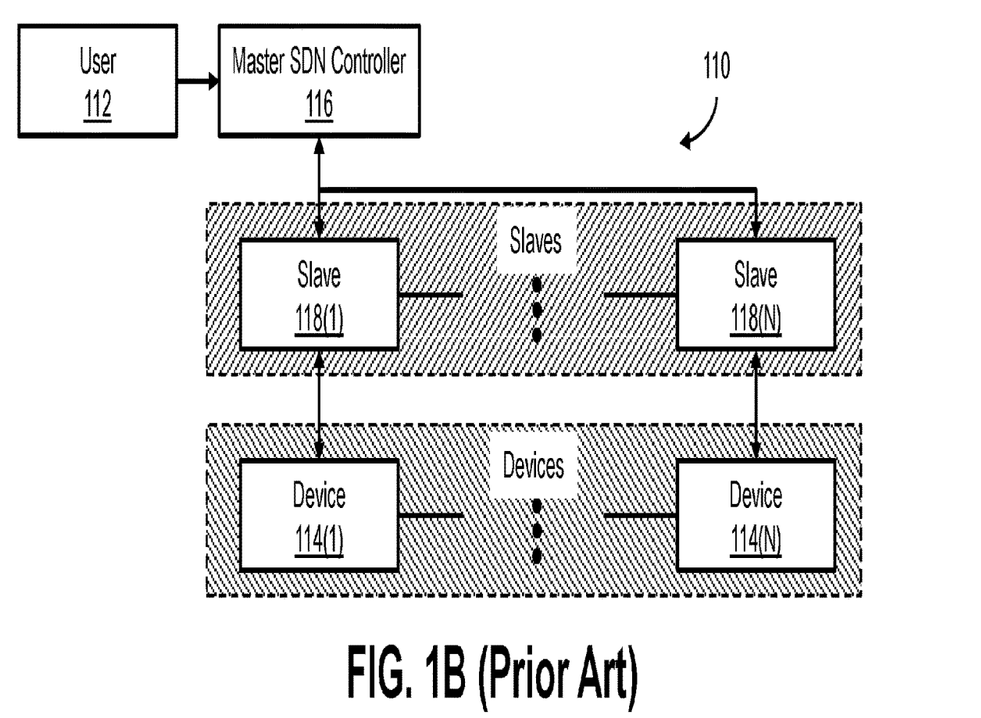
Figure 1C:
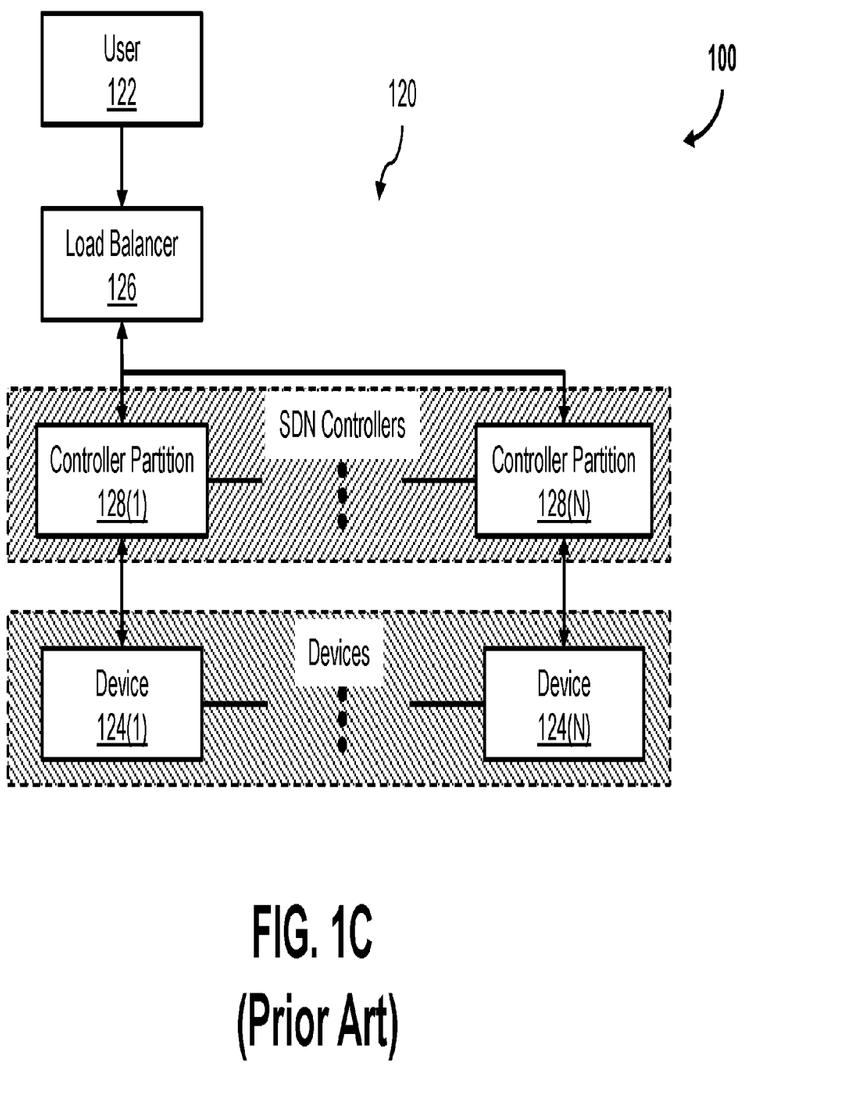

FIG. 1A is a schematic illustration of a communication system 100 having a conventional centralized SDN system architecture 102. Architecture 102 includes a central SDN controller 104 between a user 106 and one or more devices 108. FIG. 1B is a schematic illustration of a conventional master/slave SDN system architecture 110. Instead of a single central controller between a user 112 and one or more devices 114, architecture 110 includes a master SDN controller 116 managing one or more slave SDN controllers 118. FIG. 1C is a schematic illustration of a conventional partitioned SDN system architecture 120. Instead of the single central controller between a user 122 and one or more devices 124, architecture 120 includes a load balancer 126 for balancing one or more partitions 128 of an SDN controller layer 130. Each of the conventional solutions represented by system architectures 102, 110, 120 is nevertheless monolithic in the overall design, and experiences the specific problems described above.

BRIEF SUMMARY

In an embodiment, a software defined networking (SDN) controller for a communication network is provided. The SDN controller includes a northbound interface, a southbound interface, and a database as a service (DBaaS) layer. The northbound interface includes an application layer having one or more independent SDN applications. The southbound interface includes an adapter layer having one or more independent device adapters. The DBaaS layer includes a persistent DBaaS unit and a state DBaaS unit.

In an embodiment, a method for managing message flows within a software defined networking (SDN) environment is provided. The method includes steps of receiving, at an SDN controller, a user message having a synchronous portion and an asynchronous portion, and diverting the asynchronous portion into a first message flow and the synchronous portage into a second message flow. The second message flow is different from the first message flow. The method further includes steps of requesting, for the first message flow, by a device adapter of the SDN controller, data from a data store external to the SDN controller, receiving, by the device adapter from the external data store, a response to the step of requesting for the first message flow, determining whether data is present in the response, and merging, after the step of determining, the first message flow with the second message flow.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

As used herein, the term "database" may refer to either a body of data, a relational database management system (RDBMS), or both, and may include a collection of data including hierarchical databases, relational databases, flat file databases, object-relational databases, object oriented databases, and/or another structured collection of records or data that is stored in a computer system.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The embodiments described herein provide innovative systems and methods for a disaggregated SDN controller in the operation thereof. The present embodiments introduce, among other solutions, an innovative microservices architecture that enables different services to be managed independently within the control plane of the network and/or network devices.

In the centralized SDN controller architectures described above, the SDN controller is responsible for feeding data to the data plane (not shown) of switches (also not shown) to network devices. Such aggregated SDN architectures allow for configuration of the network from a single device, but nevertheless require that individual services of the control plane to be managed according to this same configuration. A typical SDN controller implements a northbound interface (NBI) for interaction of the control plane with a user/orchestrator, and southbound interface (SBI) for interaction of the control plane with the data plane/devices.

The NBI allows a user or network administrator to access the SDN to configure or retrieve information from the SDN, such as through a user interface (UI) or an application programming interface (API), through which other applications may access the SDN controller. The SBI is typically a software API, which may be open source (e.g., OpenFlow, OpFlex, etc.) or a CLI interface. According to the innovative techniques described herein, the SDN controller is configured to independently manage each SDN service, that is, to include a flexible service function chain for the control plane that is similar to that previously only employed for the data path.

The creation of this service function chain for the control plane thereby enables individual services to be scaled independently of one another other within the same network. Additionally, the present embodiments enable the network to be configured such that SDN applications may be on separate servers from southbound services. Moreover, according to the present systems and methods, inter-services communication may also be accomplished through implementation of extensible coding techniques (e.g., protocol buffers, or "protobuf") to facilitate the exchange between services. Accordingly, the present techniques advantageously enable some of the independent services to be written in different programming languages from one another, thereby further enabling some services to be optimized for performance, while enabling other services to be optimized for speed of development (i.e., some particular programming language exhibit this strength). The present techniques thus advantageously allow for the independent upgrade of some services, but without requiring resources devoted to upgrading all services managed in the control plane.

Such independent service management advantages are realized through the implementation of the microservices architecture described herein. Through this innovative architecture, the present systems and methods provide a significantly improved operation solution, which enables a network to utilize a mix of different open source and proprietary SDN controller services simultaneously, in concert, but without requiring the forced utilization of all aspects of the SDN controller.

Figure 2:
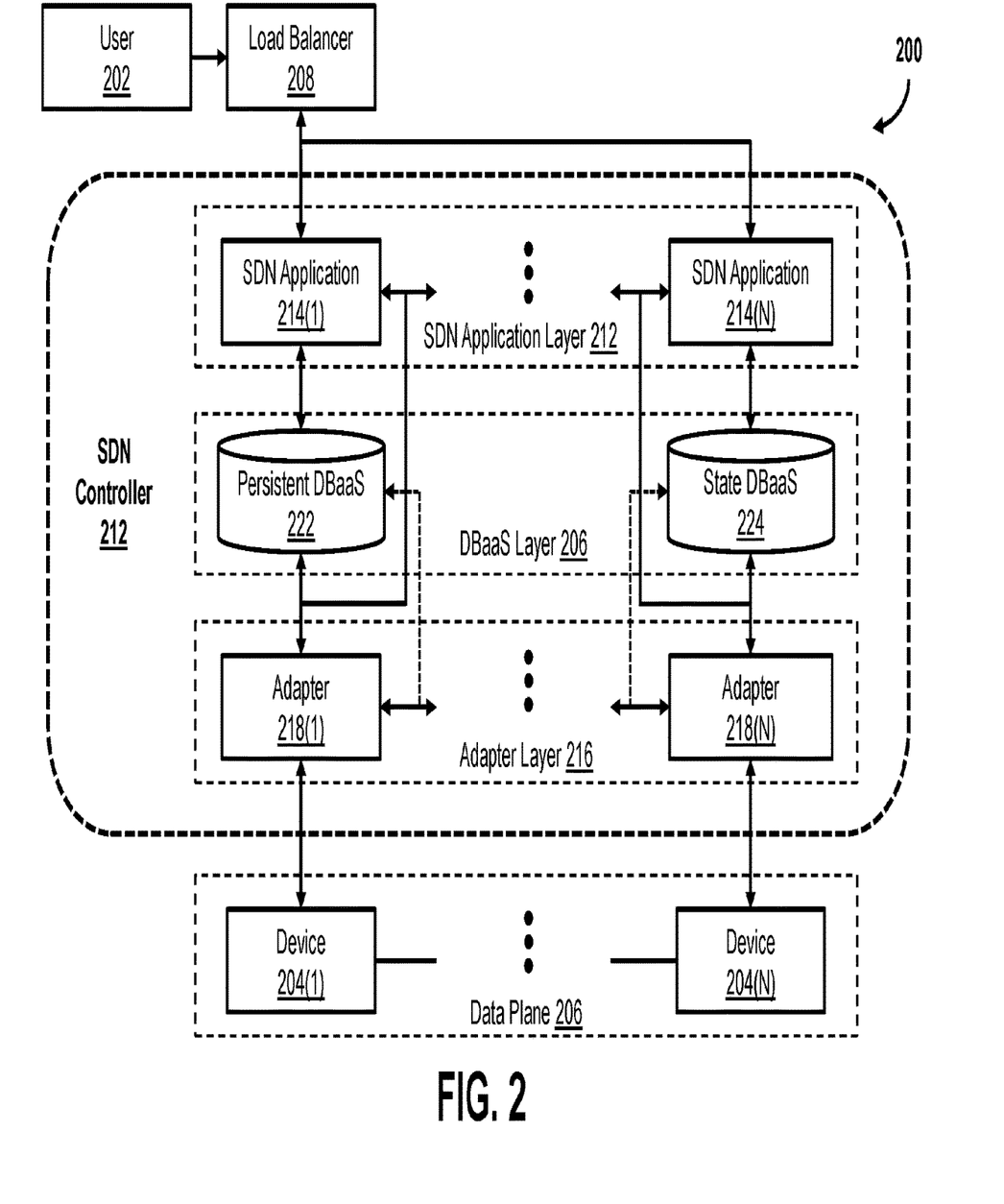
FIG. 2 is a schematic illustration of an exemplary disaggregated SDN system architecture, in accordance with an embodiment.

FIG. 2 is a schematic illustration of an exemplary disaggregated SDN system architecture 200. At a high level view, architecture 200 is similar to conventional architecture 120, FIG. 1C, and includes between a user 202 and one or more devices 204 associated with a data plane 206, a load balancer 208 and an SDN controller 210. From a more granular perspective though, the microservices architecture of SDN controller 210 represents a significant improvement over the conventional SDN controllers described above.

That is, in the exemplary embodiment, SDN controller 210 includes an SDN application layer 212 having one or more SDN applications 214, and an adapter layer 216 having one or more adapters 218. Disposed between SDN application layer 212 and adapter layer 216 is a database as a service (DBaaS) layer 220 including a persistent DBaaS 222 and a state DBaaS 224. In the exemplary embodiment, each SDN application 214 may be configured to operably communicate with one or all of other SDN applications 214, persistent DBaaS 222, state DBaaS 224, and one or more of adapters 218. Similarly, each adapter 218 may be configured to operably communicate with one or all of adapters 218, persistent DBaaS 222, state DBaaS 224, and one or more of devices 204. In some embodiments, internal and external communication among the various components of architecture 200 is managed according to individual authentication and/or authorization protocols and processes.

In the example illustrated in FIG. 2, user 202 may represent a user application, an orchestrator, orchestrator software, a system or network manager, and/or an entity having access to the network of architecture 200. Further to this example, SDN controller 210 is depicted to be a virtualized software machine. In some embodiments, one or more of the several components of SDN controller 210 may be physical hardware elements, or a virtual software elements, routines, processes, or codes operating in the control plane of one or more of network devices 204. In the exemplary embodiment, SDN application layer 212 thus serves as the NBI, and adapter layer 216 serves as the SBI.

According to this advantageous disaggregated microservices configuration, architecture 200 realizes significant advantages over, and overcomes the problems encountered by, the conventional SDN controllers described above, which run single or clustered SDN applications that are incapable of individualized management within the same SDN controller. Architecture 200 may be configured so as to provide a plurality of loosely coupled microservices of clustered SDN application instances (e.g., SDN applications 214) and device adapters (e.g., adapters 218). Through this exemplary configuration, an individual SDN application 214 may be configured to host external interfaces and/or APIs that are capable of being called by users 202, or programmed to be called by other system applications or components. Architecture 200 thus further includes one or more device adapters 218 connect with one or more physical or virtual devices 204 for the management thereof.

Such device management by adapters 218 may include, without limitation, processes to: push a network configuration to one or more devices 204; respond to a device request for a specific configuration; publish configuration information to a message bus (not shown); and react to state changes (e.g., load, time of day, faults, warnings, errors, general events, etc.). Additionally, both SDN applications 214 and adapters 218 may include, without limitation, one or more of: container; applications; processes; virtual machine; and application-specific integrated circuits (ASICs); field programmable gate arrays (FPGAs). SDN applications 214 and adapters 218 are further configured to communicate utilizing standard synchronous and asynchronous APIs, including without limitation, REST, OpenFlow, CRUD, SNMP, AMQP, XMPP, and protobuf.

In exemplary operation, SDN applications 214 are configured to contain the NBI APIs for users 202, and two make any necessary SBI API calls to the persistence layer/DBaaS layer 220 and device adapters 218. In one embodiment, for each type of device 204 being managed by SDN controller 210, at least one adapter 218 is included for the particular NBI that is responsible for converting the standard API call into a protocol that the particular device 204 can understand.

In an embodiment, network node configuration and run-time states for creation, queries, updates, or deletes facilitate data persistence APIs by issuing another set of standard REST APIs. The network topology data is not stored within SDN controller 210, but may, for example, be stored in a Graph database (GDBMS), or a relational database system (RDBMS). The innovative implementation of such different data store types, according to the present techniques, further resolve many of the problems experienced by conventional SDN controllers when managing very large networks, as described above. Although GDBMS implementations allow for fast queries to a given node, such implementations are not well suited for storing highly transient runtime states. The present techniques are thus advantageously capable to utilize simpler key/values that may be found in an in-memory database (IMDBS), for example. Through the innovative implementation of the persistence layer within SDN controller 210, the present embodiments enable the SDN architecture of the controller to realize scalability, stability, and reliability benefits similar to stateless DBaaS implementations deployed outside of the SDN environment.

Thus, according to the innovative configuration of architecture 200, storage of data is not coupled to SDN controller 210, in contrast to the conventional architectures. This beacon configuration flexibly enables architecture 202 effectively read or write to any interface, API, or data plane, and irrespective of whether a dataflow is synchronous, asynchronous, or combination of both. An exemplary operation of architecture 200 is described with respect to FIG. 3, below.

Figure 3:
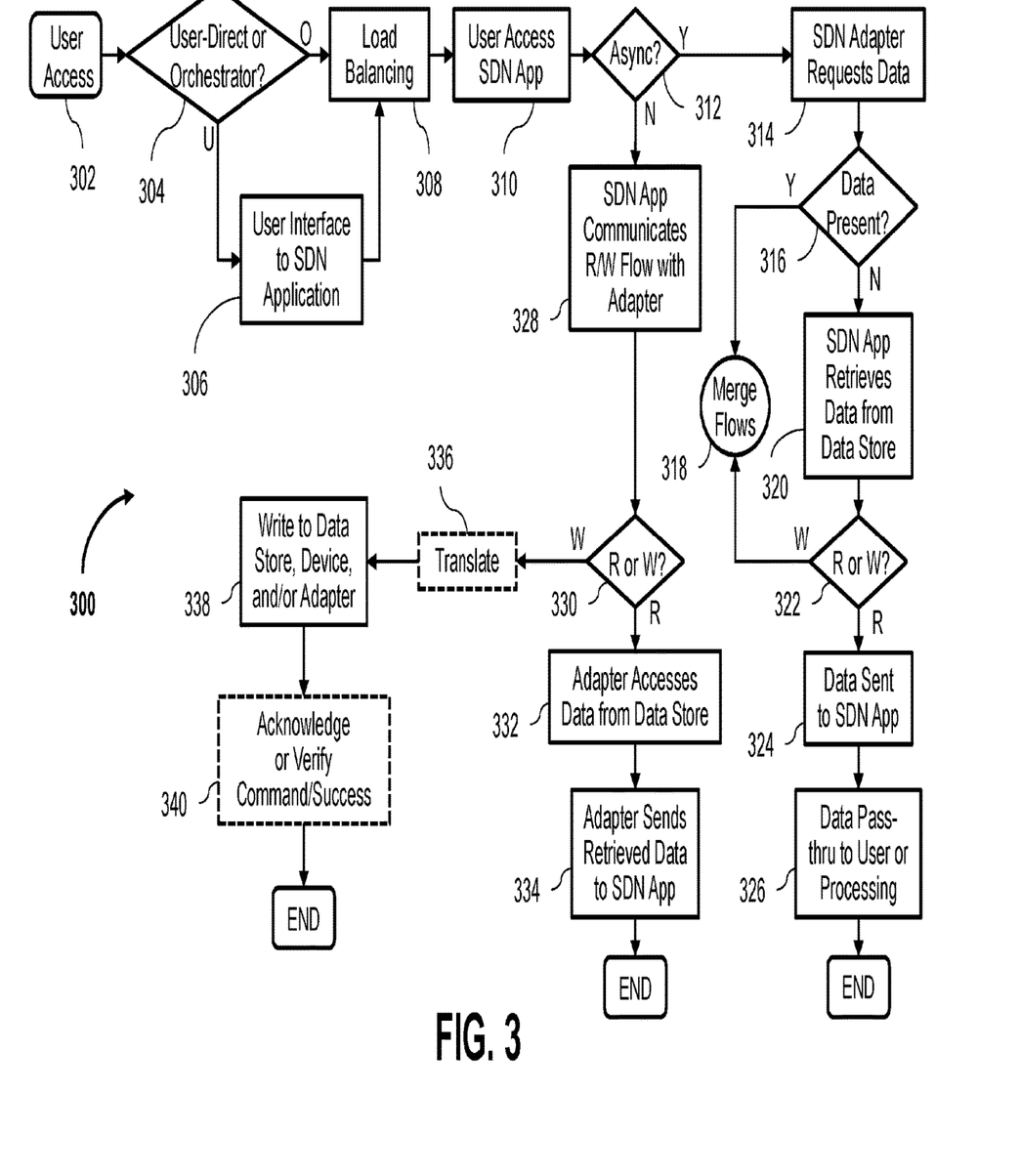
FIG. 3 is a flow diagram for an exemplary data management process for architecture depicted in FIG. 2, according to an embodiment.

FIG. 3 is a flow diagram for an exemplary data management process 300 for architecture 200, FIG. 2. In the exemplary embodiment, process 300 represents a virtualized functionality, including computer-executed instructions, logic, and or code, which may be implemented by a processor (not shown) of one or more components or terminal units of a communications network, including without limitation, a node, a modem termination system (MTS), a router, a modem, and/or a set-top box.

Process 300 begins at step 302, in which user 202 excesses architecture 200. Step 304 is a decision step. In step 304, process 304 determines whether the user access from step 302 indicates a user-direct access, or represents access from an orchestrator, manager, or orchestrator software. If, in step 304, user-direct access is determined, process 300 proceeds to step 306, in which SDN application 214 interfaces with user 202 through a user interface, such as a website. In an exemplary embodiment of step 306, user 202 utilizes a user interface to retrieve information about the network from SDN controller 210, and the user interface utilizes and API. Process 300 then proceeds from step 306 to step 308. If, in step 304, orchestrator/orchestrator software access is indicated, process 300 proceeds directly from step 304 to step 308.

In step 308, process 300 performs load balancing of users 202 accessing SDN application 214 through load balancer 208. In step 310, the load-balanced user 202 accesses SDN application 214 by a message (e.g., a request or command). Step 312 is a decision step. In step 312, process 300 determines whether the user message(s) is(are) synchronous, asynchronous, or combined data flow. If, in step 312, process 300 finds an asynchronous message, process 300 proceeds to step 314. In the exemplary embodiment, if the user message represents a synchronous/asynchronous combination, the asynchronous portion is processed separately (i.e., proceeding to step 314) from the synchronous portion. That is, in an exemplary embodiment of step 312, asynchronous and synchronous flows are diverged for separate processing. By way of example, the synchronous flows may be compared with a person-to-person phone call, where the receiving person answers the call (message) from the sender immediately, in real-time. In contrast, the asynchronous flows can be thought of as being more similar to an email, where the receiver will not "answer" the message until such time as the receiver checks the email queue.

The innovative methodology of system 300 thus allows for flexible, but simultaneous, the processing of both asynchronous and synchronous messages at the SDN controller. Conventional SDN controllers utilize a single monolithic configuration that may not dynamically adjust to such different types of messaging from various multiple entities accessing the network. Conventional SDN controllers require a significantly large, aggregated application to process the volume of requests for multiple entities. In contrast, the present systems and methods implement a disaggregated architecture 200 that may include multiple, smaller applications (e.g., at the NBI) that can be replicated many times, and each according to the particular entity and/or message flow desired or encountered. The separate asynchronous and synchronous flows are processed as follows.

In step 314, adapter 218 requests data from an external data store, corresponding to the asynchronous message, and receives a response thereto. In this example, the data request/response are described with respect to a single adapter 218, for ease of explanation. As described above, adapter 218 may represent a plurality of device adapters. Step 316 is a decision step. In step 316, process 300 determines data is present in the response received in step 314. If data is present in the response, process 300 proceeds to step 318, in which the asynchronous flow merges again with the synchronous flow that was diverged in step 312. That is, if the process is merely reading present data, adapter 218 is not immediately necessary, and SDN application 214 is able to process the merged data flows.

If, in step 316, process 300 determines that data is not present in the response, process 300 proceeds to step 320, in which SDN application 214 requests data from the data store. In an exemplary embodiment of step 320, SDN application 214 has been pre-registered with the particular data store in order to facilitate the request. In this embodiment, process 300 advantageously frees up adapter 218 when the requisite data is not provided. That is, instead of requiring adapter 218 to wait for the data, an individual SDN application is configured to separately request the data from the data store.

Step 322 is a decision step. In step 322, process 300 determines if the requested data from step 320 is, once received by SDN application 214, write data or read data. If the data is determined to be write data, process 300 proceeds again to step 318, in which the asynchronous and synchronous flows are merged. If, in step 322, process 300 determines that the received data is read data, process 300 proceeds from step 322 to step 324. In step 324, the received read data is sent back to SDN application 214. In step 326, SDN application 214 passes through the read data to user 202, which, as described above, may represent a user-direct access, or access from an orchestrator or orchestrator software. In an alternative embodiment of step 326, SDN application 214 performs further processing on the read data. Upon completion of step 326, process 304 the particular message flow.

Returning to step 312, in the case where the message flow is determined to be synchronous, or contain asynchronous portion, process 300 proceeds to step 328 for processing of the synchronous message/portion. In step 328, SDN application 214 communicates the message flow from user 202 with adapter 218. In an alternative embodiment of step 328, SDN application 214 communicates with a different SDN application 214 within SDN application layer 212, and may represent a system of emergent coordination and/or emergent cooperation. In at least one embodiment of step 328, the communication to adapter 218 from SDN application 214 includes read/write data from/to the external database or data store.

Step 330 is a decision step. In step 330, process 300 determines if the data communicated from SDN application 214 to adapter 218 is read or write data. If the data is determined to be read data, process 300 proceeds to step 332. In step 332, adapter 218 accesses and retrieves data from the data store, which may be contained within, or accessed through, device 204 (e.g., cellular phone, network device, etc.), a firewall, or a switch. In step 334, adapter 218 sends the retrieved data to SDN application 214, and process 300 ends for the particular message flow.

If, in step 330, process 300 determines that the data is write data, process 300 proceeds to step 336. Step 336 is an optional step. In step 336, process 300 performs a translation operation on the write data to translate the data to the particular device 204 containing the data store. If no such translation operation is required or desired, process 300 skips step 336, and proceeds directly to step 338. In step 338, adapter 218 writes the data to the data store of device 204, or other external database in communication with adapter 218. Step 340 is an optional step. In step 340, process 300 causes device 3042 issue a response code and/or verification of a successful write command to the data store, upon which process 300 ends for the particular message flow. If no verification/acknowledgment is indicated or required, process 300 ends after completion of step 338.

As described above, the present embodiments may be adaptively configured to replicate individual SDN applications many times, according to the particular user entity, or entities, accessing the network. The system may be advantageously constructed to included one-to-one architecture where each separate device adapter is configured to communicate with its own separate SDN application and device, respectively, or may instead be configured such that an individual SDN application manages a plurality of adapters, and an individual adapter manages a plurality, or "pod" of devices. Device is within a pod may communicate with each other, according to applicable authorization and authentication protocols, if any. Similarly, separate adapters within the adapter layer may communicate with one another, and separate SDN applications within the SDN application layer may communicate with one another.

The present systems and methods therefore advantageously utilize the standard framework of existing networks and SDN controller structures, but manage the operation thereof in a significantly improved manner. According to the innovative embodiments described herein, the SDN controller is decoupled from the data store, and therefore may be flexibly adapted to process multiple synchronous and asynchronous flows from various multiple entities simultaneously, but independently for each flow. The present embodiments therefore represent a significantly improved SDN controller in comparison with conventional SDN controller architectures having a monolithic design, and which requires coupling with a particular data store.

The present embodiments are therefore of particular commercial value to content service providers, cloud providers, and enterprise systems, all of which deploy software defined networking to create agile networks. The systems and methods described herein represent operationally scalable solution that may be implemented with all such SDN implementations. Conventional SDN controllers do not implement the microservices architectures described herein, nor do they provide for an infrastructure as a service (IaaS) or DBaaS technique for external data storage, as described herein.

According to the present techniques, the SDN application is configured to send a request for a piece of information from the data store. If the requested data is not present in the data store, or otherwise not received, the SDN application is able to wait for the data to arrive, instead of obstructing the communication flow by requiring the device adapter to wait for the information. The innovative techniques of the present systems and methods allow the data request to be diverted into a separate message queue, where it will not delay the flow of data that is available and received. Once the requested data is received in this separate queue, the diverted flows may merge together again. Through the present techniques, data may be optimally retrieved from and written to the device, but may be obtained from any data source accessing the network.

Through the exemplary configurations described above, one SDN application may serve multiple adapters in response to a user request at the NBI, or the system advantageously operates in the reverse as well. That is, the present techniques enable the management of device requests from the adapter at the SBI. In some embodiments, the SDN application layer may include individual SDN applications of parallel, or substantially coequal, management authority, or may alternatively include different sub-levels of SDN application authority and/or management responsibility. For example, the SDN controller may include a higher level SDN application representing a larger geographic (or virtual) region, under which may be a plurality of lower level SDN applications managing the message flow to the adapter layer. Similarly, a single adapter may serve a single device, or alternatively, may serve a pod of devices, a server, or a region. The flexibility of the present embodiments additionally provides advantageous interactions with AAA servers, by enabling microservice interaction on a per-application basis, for example, as opposed to a per-call basis.

Exemplary embodiments of SDN controller systems and methods are described above in detail. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A software defined networking (SDN) control system for managing message flows within an SDN environment, comprising:
   a processor; and
   a memory having computer-executable instructions encoded therein, which, when executed by the processor, cause the SDN control system to:
      receive a user message having a synchronous portion and an asynchronous portion;
      divert the asynchronous portion into a first message flow and the synchronous portion into a second message flow, wherein the second message flow is different from the first message flow;
      request, for the first message flow, data from a data store external to the SDN control system;
      obtain, from the external data store, a response to the request for the first message flow;
      determine whether data is present in the response; and
      merge the first message flow with the second message flow.

2. The SDN control system of claim 1, wherein the instructions further cause the SDN control system to determine that data from the data store is not present in the response.

3. The SDN control system of claim 2, wherein the instructions further cause the SDN control system to transmit to the external data store, an asynchronous data command from an SDN application in operable communication with the processor.

4. The SDN control system of claim 3, wherein the instructions further cause the SDN control system to identify the asynchronous data command as one of a write command and a read command.

5. The SDN control system of claim 4, wherein the asynchronous data command is a write command, and wherein the instructions further cause the SDN control system to merge the first message flow with the second message flow after identifying the asynchronous data command.

6. The SDN control system of claim 4, wherein the asynchronous data command is a read command, and wherein the instructions further cause the SDN control system to obtaining read data at the SDN application after identifying the asynchronous data command.

7. The SDN control system of claim 4, wherein the SDN control system is decoupled from the data store.

8. The SDN control system of claim 1, further comprising at least one of (i) an application layer, (ii) a DBaaS layer, and (iii) an adapter layer, and wherein one or more of the application layer, the DBaaS layer, and the adapter layer are (i) virtualized, or (ii) a physical hardware component.

9. A method for managing message flows within a software defined networking (SDN) environment including an SDN controller, comprising the steps of:
   receiving, at the SDN controller, a user message having a synchronous portion and an asynchronous portion;
   diverting the asynchronous portion into a first message flow and the synchronous portion into a second message flow, wherein the second message flow is different from the first message flow;
   requesting, for the first message flow, by a device adapter of the SDN controller, data from a data store external to the SDN controller;
   obtaining, by the device adapter from the external data store, a response to the step of requesting for the first message flow;
   determining whether data is present in the response; and
   merging, after the step of determining, the first message flow with the second message flow.

10. The method of claim 9, wherein the step of determining determines that data from the data store is present in the response.

11. The method of claim 9, wherein the step of determining determines that data is not present in the response, and wherein the step of determining comprises a substep of transmitting, by an SDN application of the SDN controller, an asynchronous data command to the external data store.

12. The method of claim 11, further comprising a substep of identifying the asynchronous data command as one of a write command and a read command.

13. The method of claim 12, wherein the asynchronous data command is a write command, and wherein the first message flow merges with the second message flow after completion of the substep of identifying.

14. The method of claim 12, wherein the asynchronous data command is a read command, and further comprising, after the substep of identifying, a substep of obtaining read data at the SDN application.

15. The method of claim 14, further comprising a substep of passing, by the SDN application, the obtained read data through to an originator of the user message.

16. The method of claim 15, wherein the originator of the user message is one of a manager, an orchestrator, orchestrator software, and user-direct.

17. The method of claim 14, further comprising a substep of processing, by the SDN application, the obtained read data.

18. The method of claim 9, wherein the data store resides in a networking device external to the SDN controller, and wherein the device adapter is configured to communicate with the networking device.

19. The method of claim 18, wherein the SDN controller is decoupled from the data store of the networking device.

20. The method of claim 18, wherein the networking device includes at least one of a modem termination system, a router, a cellular phone, a modem, a communication node, a switch, and a firewall.

\* \* \* \* \*